United States Patent Office 3,401,462
Patented Sept. 17, 1968

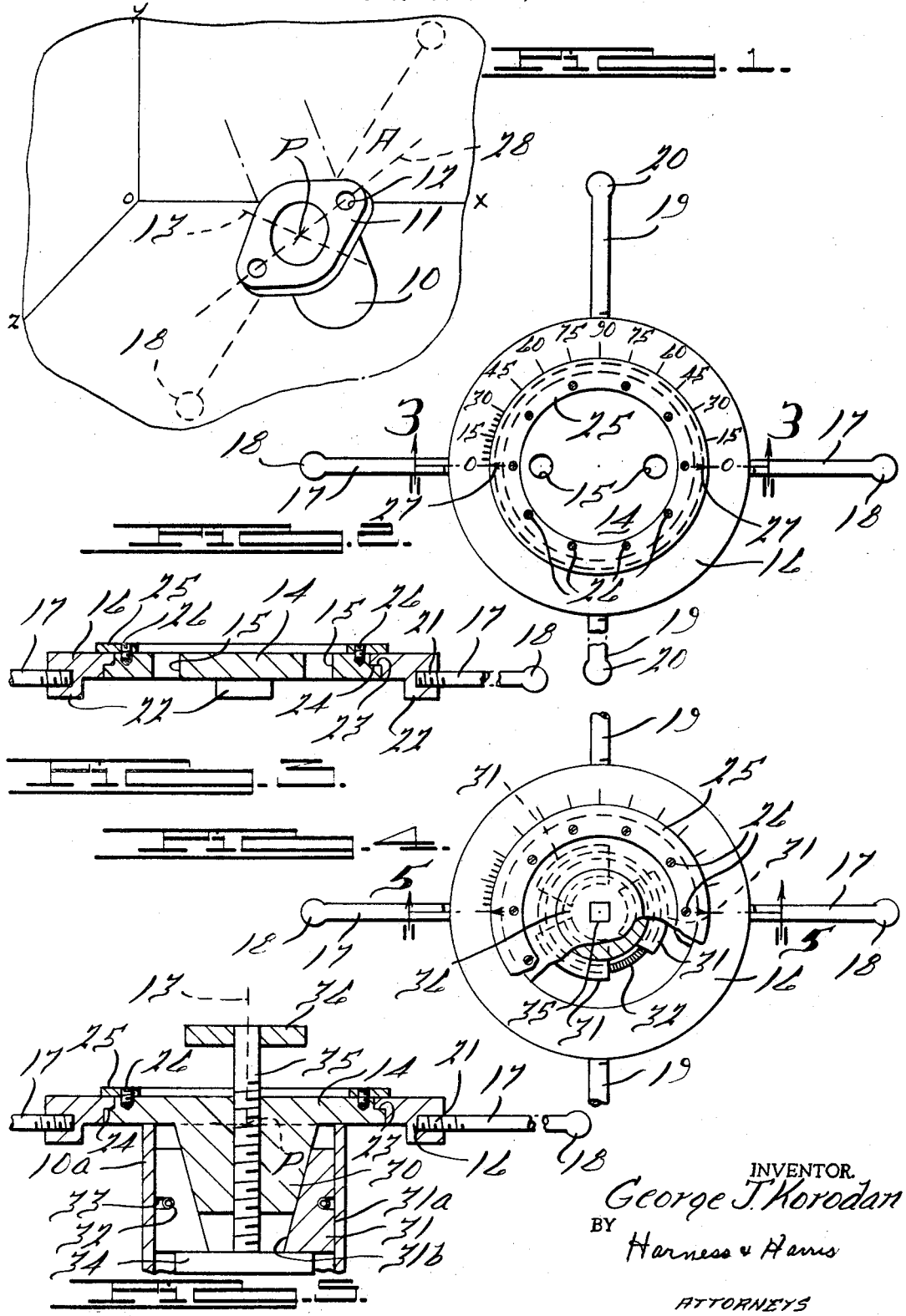

3,401,462
ROTATABLE TOOL
George J. Korodan, St. Clair Shores, Mich., assignor to Chrysler Corporation, Highland Park, Mich., a corporation of Delaware
Filed Mar. 14, 1966, Ser. No. 534,060
9 Claims. (Cl. 33—180)

ABSTRACT OF THE DISCLOSURE

A compound sine bar for measuring angular relationships of a specific axis of an object comprises at least three gauge spheres fixed with respect to a rotatable element. Two of the gauge spheres are located on a first diameter through the axis of rotation of the element. The third gauge sphere is located on a second diameter crossing the first at the axis of rotation. The rotatable element is rotatably mounted on a body having means for attachment to the object with said axes in coaxial alignment.

---

This invention relates to a tool and to a method for measuring or checking compound angles, as for example, the angular relationships of an axis which might be oblique to an orthogonal set of reference planes.

Particular applications of the present invention are involved in the checking of the angular relationships of the axis of the bore of an exhaust duct for an automobile engine, or of the angle of the flange on the duct relative to the horizontal and vertical mid-planes of the vehicle body, or the caster and camber of parts of the vehicle steering linkage, for example, wherein the angles to be measured are known as compound angles, i.e. are oblique to the customary reference planes.

Heretofore the measurement of such angles involved relatively complex and laborious computations which are not only time consuming, but require mathematical skill beyond the ability of the average mechanic. Accordingly, as for example in the case of certain types of automobile exhaust assemblies, expensive and accurate checking gauges are prepared for each specific engine design, so that the exhaust pipe assembly manufactured by a supplier can be checked prior to installation on the engine. Occasionally the exhaust pipe assembly will not fit the checking gauge, whereupon costly delays are encountered in determining whether the pipe assembly has been constructed according to the desired specifications, or whether the checking gauge is in error and requires recertification.

The angles involved in such instance could always be measured and their deviation from the specifications, if any, could be computed by conventional methods. As aforesaid however, the computations are complex and the number of mechanics having the necessary training to make the calculations is limited, so that the gauge in such an event must usually be returned to the gauge make for recertification.

An object of the present invention is to provide a simple tool and method for measuring certain angular relationships of an axis having a compound angle, whereby a skilled draftsman or mechanic, without recourse to complex mathematics, can readily compare the compound angles of the axis of a particular structure with a scale layout drawing of the structure and determine the latter's accuracy with respect to the original specifications marked on the layout.

Another and more specific object is to provide such a tool comprising a pair of cross arms rotatable in unison on a tool body, the cross arms being at right angles to each other and to the axis of rotation. The tool body is attachable to the structure in predetermined angular and axial relationship with respect to the axis having the compound angle to be measured, such that the cross arms are rotatable about said axis. Means are carried by the tool body and cross arms for measuring the relative angular displacement therebetween. In this situation, the essence of the invention lies in the concept of rotating the cross arms about the axis of the structure until one of the cross arms is parallel to one of the orthogonal reference planes, whereby the angle of the oblique axis and of various reference lines or planes normal to the axis can be readily determined.

Other objects of this invention will appear in the following description and appended claims, reference being had to the accompanying drawings forming a part of this specification wherein like reference characters designate corresponding parts in the several views.

FIGURE 1 is a isometric view of part of an automobile exhaust pipe assembly, shown in an orthogonal reference system.

FIGURE 2 is an enlarged plan view of a tool embodying the present invention and adapted to be secured to the end flange of the exhaust pipe assembly of FIGURE 1.

FIGURE 3 is a fragmentary sectional view taken in the direction of the arrows substantially along the line 3—3 of FIGURE 2.

FIGURE 4 is a view similar to FIGURE 2, illustrating a modification.

FIGURE 5 is a fragmentary sectional view taken in the direction of the arrows substantially along the line 5—5 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, an application of the present invention is illustrated by way of example in measuring the angular relationships of the axis 13 of an exhaust pipe 10 at the intersection P between the axis 13 and the plane of the upper surface of the end flange 11 which is integral with pipe 10 and is adapted to be secured to a mating flange on the automobile engine by means of bolt holes 12. The axis 13 of the exhaust pipe 10 at the plane of the aforesaid surface of flange 11 is perpendicular to the latter in the present instance. Also in FIGURE 1, the exhaust pipe 10 is illustrated with respect to three horizontal reference planes, wherein the plane XOY represents the vertical longitudinal mid-plane of the vehicle body, the plane XOZ represents the horizontal or ground plane, and the plane YOZ represents a transverse vertical plane.

The exhaust pipe 10 is illustrated in FIGURE 1 in the same relationship that would be obtained if the pipe 10 were secured to the vehicle engine. For the purpose of measuring the angle of the axis 13 (which in the usual situation will be oblique to all of the reference planes) or other relationships of the exhaust pipe 10, the latter is supported in the position shown on a horizontal worktable by a suitable means.

The measuring or checking tool illustrated in FIGURE 2 comprises a circular body or base plate 14 having diametrically spaced locating members comprising bolt holes 15 adapted to be aligned with the holes 12, whereby the plate 14 and flange 11 are secured together as a unit with the plane undersurface of plate 14 parallel and flush with the plane of the upper surface of flange 11. Rotatable coaxially about the plate 14 is a circular protractor type gauge member 16 having a diametrically extending cross arm 17 comprising a pair of radial rods which terminate in measuring or gauge spheres 18 centered on the plane of the aforesaid undersurface of plate 14 and on a diameter through the centers of the locating holes 15 when in the zero position shown. Also extending at right angles to the arm 17 is a second diametrical cross arm 19 comprising a second pair of radial rods terminating in measuring or gauge spheres 20, also centered on the plane of the undersurface of plate 14. The diameters of the spheres 18 and 20 and the distance between their centers are accurately known, so that their centers may thus be employed as reference points in any measurements with respect to the reference planes of FIGURE 1. Preferably, all of the spheres 18 and 20 have equal diameters and the radial distance from the central axis of plate 14 to the centers of the spheres 18 and 20 is the same in each instance to facilitate computations.

The arms 17 and 19 are screwed radially into precision screw holes 21 contained within integral bosses 22 of member 16, the screw holes 21 being provided with accurate stops for precisely predetermining the radial positions of the cross arms 17, 19 in the member 16, so that both the axial and radial locations of the centers of the measuring spheres 18 and 20 will be accurately predetermined. The plate 14 is provided with a recess around its upper periphery to effect an annular shoulder 23. A mating annular shoulder 24 is provided at the inner circumference of the member 16, such that the shoulder 24 seats coaxially on the shoulder 23 and enables the relative rotation of the protractor member 16 with respect to the plate 14. An annular collar 25 is secured coaxially to the body 14 by screws 26 and overlaps the adjacent inner periphery of the member 16 to secure the latter rotatably to the plate 14.

A pair of reference marks or indicators 27 are provided on the outer periphery of the upper surface of collar 25 on the diametrical plane through the centers of the holes 15. The member 16 is calibrated in degrees measuring from 0° to 90° in opposite directions from the diameter through the centers of the spheres 18, so that when the plate 14 is secured to the flange 11 by means of screws or bolts passing through the aligned holes 12 and 15, the diametrical plane through the centers of the spheres 18 and holes 15 will coincide with the diameter 28 through the holes 12 and will also pass through the reference marks 27 on the collar 25 and the 0° reference marks on the protractor member 16.

In operation of the tool, the latter is assembled to the exhaust pipe 10 as aforesaid, with the diameter through the centers of the spheres 18 also passing through point P. The rotatable member 16 is then rotated until the cross arm 17 is parallel to one of the reference planes of FIGURE 1, as for example the horizontal plane XOZ. The angle through which the arm 17 is rotated can be read directly from the scale on member 16 with respect to the reference marks 27 and will be a direct reading of the angle A of rotation of the axis 28 about the axis 13 from the horizontal reference plane XOZ in FIGURE 1. This angle, or a similar angle with respect to plane XOY or plane YOZ, will be indicated on the blueprint or layout and can thus be compared directly with the layout without resort to mathematical calculations.

The angle made by the cross arm 19 with respect to the selected reference plane XOZ can be readily determined by measuring the distances from the latter plane to the surface of each sphere 20. Inasmuch as the diameters of the spheres 20 and the distance therebetween are known, the angle of the cross arm 19 with respect to plane XOZ for example can be readily determined by simple calculations, or can be read directly from tables prepared for that purpose. The height of point P above the horizontal plane XOZ, which height is also usually indicated on the print or layout, will be equal to the corresponding heights of the centers of the spheres 18. Similarly the distances of point P from planes XOY and YOZ will be equal to the mean of the corresponding distances from the centers of the spheres 18.

The angle of the cross arm 19 with respect to the plane XOZ will measure the angle of inclination or dip of the surface of flange 11 with respect to the reference plane XOZ, or will measure the complement of the corresponding angle of inclination of the axis 13 with respect to the plane XOZ. One or the other of such angles will be illustrated on the layout drawing or will be determinable therefrom, so that direct comparison can again be made. In addition, the angle of the cross arm 17 with respect to one or the other of the planes YOZ or XOY will measure the "strike" of the plane of the flange 11 at its intersection with the plane XOZ, which angle likewise will be given on the blueprint or layout where the determination of this relationship is necessary. Accordingly, the cross arm 17 may be referred to as a strike indicating arm and the cross arm 19 may be referred to as a dip indicating arm.

After a comparatively short period of training in the use of the tool, a mechanic or draftsman unskilled in mathematics can readily determine critical angular relationships of the exhaust pipe 10 with the blueprint without recourse to complex calculations. The arms 17 and 19 may be secured to the member 16 in any conventional manner, or may be formed integrally therewith if desired. By virtue of the screw threaded attachment shown, one or the other of the arms 17 or 19 can be temporarily removed to facilitate rotation of the member 16 in situations where such rotation with the arms attached would be impossible, as for example when the flange 11 is proximate the engine or other structure that would block rotation of the arms 17 or 19.

Any suitable means may be provided for securing the plate 14 coaxially with the axis of the exhaust pipe 10 or other bore or spindle to be measured. For example, in FIGURES 4 and 5, the plate 14 is provided with a coaxial depending integral conical projection 30 adapted to support three mating conical dogs 31. The three dogs 31 are spaced uniformly around the periphery of the projection 30 and are maintained in position by a garter-type spring 32 recessed into circumferentially extending notches 33. The outer surfaces 31a of the dogs 31 define a cylindrical surface coaxial with projection 30 and plate 14, whereas their inner surfaces 31b define a conical surface having the same conical angle as the outer surface of projection 30.

Underlying the outer ends of the dogs 31 is a circular clamping disc 34 secured coaxially to the lower end of a screw shaft 35 which is screwed coaxially through the extension 30 and is secured at its upper end to a knurled knob 36 for manual adjustment. By inserting the dogs 31 into a bore, for example the bore of a pipe 10a until the undersurface of plate 14 is flush with the upper end plane of the pipe 10a and thereafter tightening the knob 36 to draw the support 34 upwardly and expand the dogs 31 radially outwardly, the plate 14 can be secured coaxially with the pipe 10 without attachment to the flange 11. A tool of the type illustrated in FIGS. 4 and 5 is useful where no flange 11 exists. In other respects, the structure and operation of the tool will be the same as described above, particularly in regard to determination of the angle of axis 13 of pipe 10a and the location of its intersection at point P with the plane of the upper end of the pipe 10a.

1. In the method of measuring specific angular relationships of an axis with respect to a set of orthogonal reference planes, the steps of mounting a pair of cross arms intersecting said axis at right angles to each other for rotation as a unit about said axis and in parallelism with a transverse plane normal to said axis, rotating said cross arms about said axis and parallel to said transverse plane until one of said cross arms is parallel to one of said reference planes, measuring the angle between the other of said cross arms and said one reference plane to determine the dip of said transverse plane with respect to said one reference plane.

2. In the method according to claim 1, including in addition the method of determining the angle of rotation about said axis from said first-named reference plane of a predetermined diametrical line through said axis, the step of aligning said one cross arm in parallelism with said diametrical line prior to the aforesaid rotating of said cross arms about said axis, then measuring the angle required to rotate said one cross arm into parallelism with said one reference plane.

3. In a tool for use with an object having a specific axis wherein angular relationships of said axis are to be measured, a body, a member rotatable on said body about an axis of rotation, means for securing said body to said object with said axes aligned coaxially, first and second arm means fixed with respect to said member for rotation as a unit therewith, said first arm means having a pair of gauge spheres of predetermined radii centered at reference points spaced a predetermined distance apart and aligned with a first diameter through said axis of rotation, said second arm means having a gauge sphere of predetermined radius centered at a third reference point spaced a predetermined distance from said axis of rotation and aligned with a second diameter through said axis of rotation transverse to said first diameter.

4. In a tool according to claim 3, means on said body for abutting said object to locate one of said diameters in a predetermined plane normal to said specific axis and intersecting the latter at a predetermined location.

5. In a tool according to claim 3, said first and second diameters being at rights angles to each other.

6. In a tool according to claim 10, locating means on said body for locating the latter in predetermined angular relationship with respect to said object, indicia on said body and member adapted to be aligned when said member is rotated to a predetermined angular position with respect to said body, and calibrated means on said body and member for measuring the angular displacement of said member from said predetermined angular position.

7. In a tool according to claim 5, the first-named pair of reference points being spaced equidistant from said axis of rotation at diametrically opposite sides thereof.

8. In a tool according to claim 7, means on said body for abutting said object to locate the intersection of one of said diameters with said aligned axes at a predetermined location.

9. In a tool according to claim 6, said locating means comprising a pair of bolt holes through said body parallel to said axis of rotation, the axes of said bolt holes intersecting one of said diameters when said member is at said predetermined angular position with respect to said body.

References Cited

UNITED STATES PATENTS

| | | | |
|---|---|---|---|
| 1,679,931 | 8/1928 | Covell | 33—75 |
| 2,039,051 | 4/1936 | Ballou. | |
| 2,119,206 | 5/1938 | Frisz. | |
| 2,205,311 | 6/1940 | Sabatello. | |
| 2,602,228 | 7/1952 | Webber | 33—75 X |
| 2,803,881 | 8/1957 | Baker | 33—75 |

FOREIGN PATENTS

| | | |
|---|---|---|
| 1,039,336 | 5/1953 | France. |
| 160,112 | 8/1957 | Sweden. |

WILLIAM D. MARTIN, JR., *Primary Examiner.*